United States Patent
Bringuier et al.

(10) Patent No.: US 11,181,707 B2
(45) Date of Patent: *Nov. 23, 2021

(54) OPTICAL FIBER CABLE JACKET WITH LOW MODULUS OF ELASTICITY

(71) Applicant: CORNING RESEARCH & DEVELOPMENT CORPORATION, Corning, NY (US)

(72) Inventors: Anne Germaine Bringuier, Taylorsville, NC (US); Xiaole Cheng, Painted Post, NY (US); Yanfei Li, Corning, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,564

(22) Filed: Feb. 12, 2020

(65) Prior Publication Data
US 2020/0271880 A1 Aug. 27, 2020

Related U.S. Application Data

(60) Provisional application No. 62/810,421, filed on Feb. 26, 2019.

(51) Int. Cl.
*C08L 23/06* (2006.01)
*G02B 6/44* (2006.01)
*C08L 53/00* (2006.01)

(52) U.S. Cl.
CPC ........... *G02B 6/4432* (2013.01); *C08L 23/06* (2013.01); *C08L 53/00* (2013.01); *G02B 6/4436* (2013.01); *C08L 2201/02* (2013.01); *C08L 2201/08* (2013.01); *C08L 2207/04* (2013.01); *C08L 2207/066* (2013.01); *G02B 6/4434* (2013.01)

(58) Field of Classification Search
CPC .. G02B 6/4432; G02B 6/4434; G02B 6/4436; C08L 23/06; C08L 53/00; C08L 2207/066; C08L 2207/04; C08L 2201/08; C08L 23/04

See application file for complete search history.

(56) References Cited

U.S. PATENT DOCUMENTS

| | | | |
|---|---|---|---|
| 6,215,931 B1 | 4/2001 | Risch et al. | |
| 9,915,799 B2 | 3/2018 | Risch et al. | |
| 10,131,774 B2 * | 11/2018 | Bringuier | C08L 23/04 |
| 10,591,691 B1 | 3/2020 | Evans | |
| 2007/0183729 A1 | 8/2007 | Chase et al. | |
| 2008/0279514 A1 | 11/2008 | Kundis et al. | |
| 2016/0032096 A1 * | 2/2016 | Handlin, Jr. | C08L 53/025 525/98 |
| 2017/0235069 A1 | 8/2017 | Risch et al. | |
| 2018/0134883 A1 | 5/2018 | Bringuier et al. | |
| 2019/0154934 A1 | 5/2019 | Cheng et al. | |

FOREIGN PATENT DOCUMENTS

| | | |
|---|---|---|
| JP | 8262294 A | 10/1996 |
| WO | 2016/060647 A1 | 4/2016 |

OTHER PUBLICATIONS

International Search Report and Written Opinion of the International Searching Authority; PCT/US2020/016772; dated May 7, 2020; 14 Pages; ISA/US Commissioner for Patents.

* cited by examiner

*Primary Examiner* — Peter D. Mulcahy
(74) *Attorney, Agent, or Firm* — William D. Doyle

(57) ABSTRACT

Embodiments of the disclosure relate to a polymer composition. The polymer composition includes from 0% to 80% by weight of a polyolefin component and from 20% to 100% by weight of a thermoplastic elastomer component. The polymer composition has an elastic modulus of less than 1500 MPa at −40° C. as measured using dynamic mechanical analysis according to ASTM D4065. Further, the polymer composition has a coefficient of thermal expansion as averaged over the temperature range of −40° C. to 25° C. of more than $120 \times 10^{-6}$/K when measured according to ASTM E831, and the polymer composition has a thermal contraction stress of no more than 4.0 MPa at −40° C. as measured using dynamic mechanical analysis. Additionally, embodiments of an optical fiber cable having a cable jacket made of the polymeric composition are disclosed herein.

24 Claims, 4 Drawing Sheets

OPTICAL FIBER CABLE JACKET WITH LOW MODULUS OF ELASTICITY

CROSS-REFERENCED TO RELATED APPLICATIONS

This application claims the benefit of priority under 35 U.S.C. § 119 of U.S. Provisional Application Ser. No. 62/810,421 filed on Feb. 26, 2019, the content of which is relied upon and incorporated herein by reference in its entirety.

BACKGROUND

The present invention is related to a polymer composition having a low modulus of elasticity and, in particular, to a polymer composition particularly suitable for use as an optical fiber cable jacket. Some polyolefins have advantageous properties for use as cable jacketing materials for a variety of cable types. In particular, certain polyolefins have good flexibility and are able to maintain certain relevant mechanical properties over a range of operating temperatures. The polyolefins can be extruded to surround the cable so as to help protect the interior components of the cable from the environment in which the cable is deployed.

SUMMARY

In one aspect, embodiments of the present disclosure relate to a polymer composition. The polymer composition includes from 0% to 80% by weight of a polyolefin component and from 20% to 100% by weight of a thermoplastic elastomer component. The polymer composition has an elastic modulus of at most 1500 MPa at −40° C. as measured using dynamic mechanical analysis according to ASTM D4065. Further, the polymer composition has a coefficient of thermal expansion as averaged over the temperature range of −40° C. to 25° C. of at least $120 \times 10^{-6}$/K when measured according to ASTM E831, and the polymer composition has a thermal contraction stress of at most 4.0 MPa at −40° C. as measured using dynamic mechanical analysis.

In another aspect, embodiments of the present disclosure relate to an optical fiber cable. The optical fiber cable includes at least one optical fiber and a polymeric jacket that surrounds the at least one optical fiber. The polymeric jacket is formed at least in part from a polymer composition including from 0% to 80% by weight of a polyolefin component and from 20% to 100% by weight of a thermoplastic elastomer component. The polymer composition has an elastic modulus of at most 1500 MPa at −40° C. as measured using dynamic mechanical analysis according to ASTM D4065. Further, the polymer composition has a coefficient of thermal expansion as averaged over the temperature range of −40° C. to 25° C. of at least $120 \times 10^{-6}$/K when measured according to ASTM E831, and the polymer composition has a thermal contraction stress of at most 4.0 MPa at −40° C. as measured using dynamic mechanical analysis.

In yet another aspect, embodiments of the present disclosure relate to an optical fiber drop cable. The optical fiber drop cable includes at least one optical fiber and a buffer tube disposed around the at least one optical fiber. Further, the optical fiber drop cable includes a plurality of tensile yarns disposed around the buffer tube and a polymeric jacket disposed around the plurality of tensile yarns. The polymeric jacket is formed at least in part from a polymer composition consisting essentially of from 0% to 80% by weight of a polyolefin component, from 20% to 100% by weight of a thermoplastic elastomer component, and from 0% to 40% by weight of a filler component. The polymer composition has an elastic modulus of 200 MPa to 1500 MPa at −40° C. as measured using dynamic mechanical analysis according to ASTM D4065, and the polymer composition has a coefficient of thermal expansion as averaged over the temperature range of −40° C. to 25° C. of $120 \times 10^{-6}$/K to $300 \times 10^{-6}$/K when measured according to ASTM E831.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
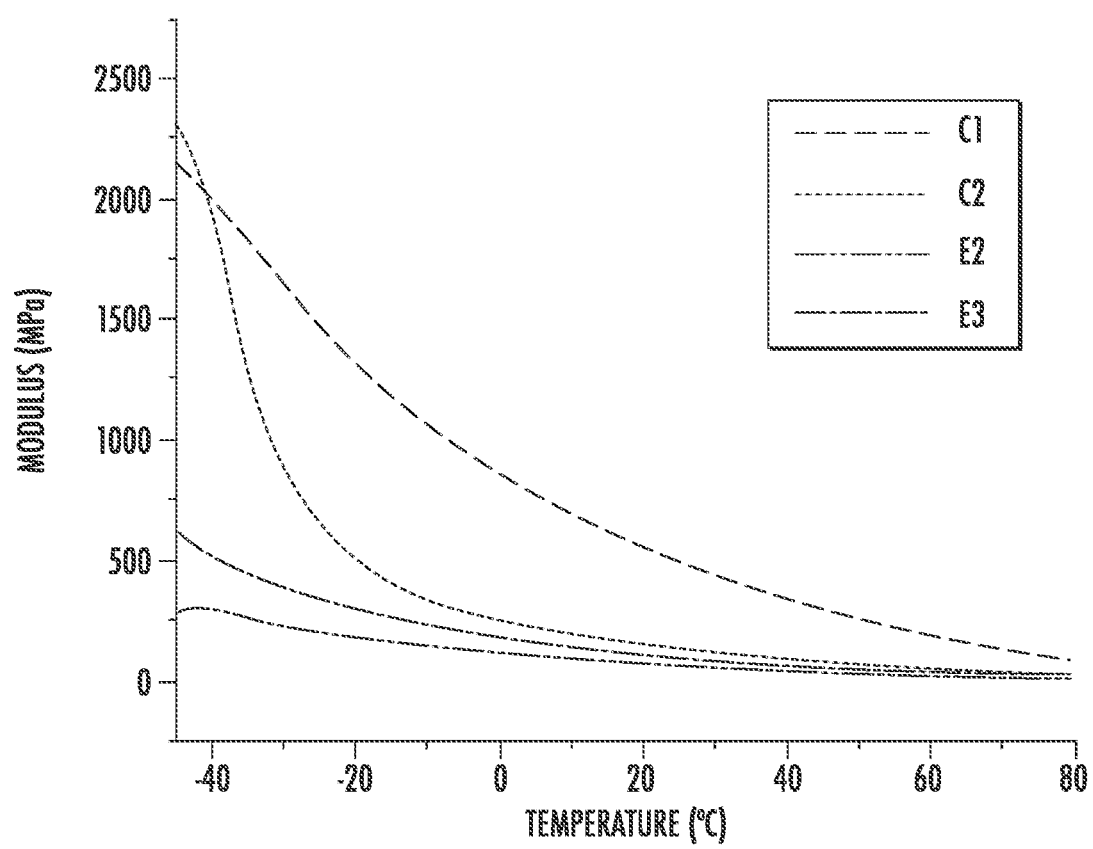
FIG. 1 is a graphical representation of the elastic modulus over a range of temperatures for polymer compositions made according to an exemplary embodiment as well as for comparative examples.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Referring generally to the figures, various embodiments of a polymer composition having a low modulus of elasticity, especially down to the temperature −40° C., are provided. The low modulus of elasticity of the polymer composition leads to a reduction in contraction force at −40° C. In embodiments, the polymer composition is utilized as a component of an optical fiber cable, in particular as a cable jacket. As a cable jacket material, the polymer composition improves the temperature cycling performance of optical fiber cables. Advantageously, by using a cable jacket made of the disclosed polymer composition, stiff or hard glass yarns can be replaced with, e.g., soft aramid yarns as tensile elements, which allows for bending performance to be improved. Additionally, such cables can be made more cost-effectively because smaller strengthening elements (e.g., glass-reinforced plastic strengthening rods) can be used and because more fibers can be included in the optical fiber cable without sacrificing the low temperature performance. Alternatively, a cable jacket of the disclosed polymer composition allows for the use of smaller tubes and, therefore, a smaller cable outer diameter as a result of the lower contraction of the overall cable at cold temperatures. In embodiments, the polymer composition can be used to reduce the thermal strain on optic fiber cable components (e.g., outer cable jackets, inner cable jackets, binder layers, etc.) for cables such as drop cables, loose tube cables, ribbon cables, indoor cables, etc. While embodiments of the polymer composition are discussed in the context of optic fiber cables, such discussion is not intended to limit the possible contexts and applications in which the polymer composition can be utilized.

As mentioned above, the disclosed polymer composition has particular applicability for reducing the thermal contraction strain in loose tube optic fiber cables. One way to express the thermal strain of a loose tube cable is provided in the following equation:

$$\varepsilon_T(T_o) = \frac{\sum_{Cable}\left(E_i(T)A_i \int_{T_a}^{T_o} \alpha_i(T)dT\right)}{\sum_{Cable}(E_i(T)A_i)}$$

where E is a material's elastic modulus, A is a material's cross-sectional area, and a is a material's coefficient of thermal expansion (CTE). In the presently disclosed polymer composition, the components of the polymer composition are selected so as to reduce thermal contraction of the cable jacket or inner jacket material, which happens at cold temperatures and causes optical attenuation increase. By reducing the thermal strain, the thermal contraction stress is reduced. In previous attempts to reduce thermal strain, focus was made on reducing the CTE of the cable jacket material. However, while such compositions were successful in reducing thermal strain, the cost of the low-CTE material was prohibitively high for certain applications, and the low-CTE jacket material had higher surface friction than other conventional materials, which was disadvantageous for certain cable installation methods (such as "jetting" or "blowing" the cable through ducts). Additionally, the low-CTE materials tended not to be compatible with certain cable access technologies because the low-CTE material was too compatible with the access feature (e.g., strip of polypropylene running along the longitudinal axis of the cable jacket), leading to enhanced adhesion between the low-CTE material and the access feature.

Thus, in contrast to low-CTE compositions, embodiments of the presently disclosed polymer composition seek to reduce the elastic modulus over the cable operating temperature range of −40° C. to 80° C. In this regard, the presently disclosed polymer composition includes a mixture of a polyolefin component and a thermoplastic elastomer component. Embodiments of the disclosed polymer composition have an elastic modulus that is below 1500 MPa over the entire temperature range from −40° C. to 80° C. Further, in embodiments, the polymer composition exhibits a thermal contraction stress of no more than 4.0 MPa at −40° C. In embodiments, the polymer composition is used as a cable jacket that surrounds one or more buffer tubes that hold optical fibers or optical fiber ribbons, and in other embodiments, the polymer composition is used as an inner layer jacket of a bilayer jacket structure with an outer layer of a standard cable jacket material.

In embodiments, the polymeric composition includes a polyolefin component, a thermoplastic elastomer component, and optionally a filler component. In exemplary embodiments, the polyolefin component can include at least one of medium-density polyethylene (MDPE), high-density polyethylene (HDPE), low-density polyethylene (LDPE), linear low-density polyethylene (LLDPE), or polypropylene (PP) copolymer, among other polyolefins. In embodiments, the polyolefin component is from 0% to 80% by weight of the polymer composition. In other embodiments, the polyolefin component is from 20% to 70% by weight of the polymer composition, and in still other embodiments, the polyolefin component is from 40% to 60% by weight of the polymer composition.

In exemplary embodiments, the thermoplastic elastomer component of the polymer composition can include at least one of olefin block copolymers, olefin random copolymers, ethylene-propylene rubber (EPR), ethylene-propylene-diene rubber (EPDM), ethylene-octene (EO), ethylene-hexene (EH), ethylene-butene (EB), ethylene-vinyl acetate (EVA), ethylene-butyl acetate (EBA), and styrene-ethylene-butadiene-styrene (SEBS), among others. In an embodiment, the polymer composition includes from 20% to 100% by weight of the thermoplastic elastomer. In further embodiments, the polymer composition includes from 30% to 80% by weight of the thermoplastic elastomer, and in other embodiments, the polymer composition includes from 40% to 60% by weight of the thermoplastic elastomer.

In embodiments in which it is included, the filler component can be added to reduce cost or to provide an additional functionality. For example, the filler component can be configured to provide flame retardance. Exemplary flame retardant fillers include, alumina trihydrate (ATH), magnesium hydroxide (MDH), boehmite (aluminum oxide hydroxide), calcium carbonate ($CaCO_3$), and intumescent additives (e.g., melamine, ammonium polyphosphate, pentaerythritol, polyphosphinates and other phosphorus-containing compounds), among others. The filler component may include one or more of the flame retardant additives and/or one or more other filler materials, such as talc, carbon black, $TiO_2$, etc. In a particular embodiment, the filler material comprises at least 2.5% by weight of carbon black for UV protection in outdoor applications. In embodiments, the polymer composition includes up to 40% by weight of the filler component.

In embodiments, the polymeric composition consists essentially of just the polyolefin component, the thermoplastic elastomer component, and optionally the filler component. That is, the polymeric composition may contain no additional components. However, in certain embodiments, the polymer composition may include other minor processing and/or performance additives that do not materially affect the basic and novel characteristics of the disclosed polymeric composition. For example, a dispersant may be added to aid dispersion of the filler component. Still further, the polymer composition can include up to 1% by weight of a low friction additive, such as a fatty acid or a fatty acid amide. For example, the fatty acid can have a carbon backbone of between $C_6$ to $C_{25}$ and be saturated or unsaturated. Specific examples include caprylic acid, capric acid, lauric acid, myristic acid, palmitic acid, stearic acid, arachidic acid, behenic acid, lignoceric acid, cerotic acid, etc. Similarly, the fatty acid amide can have carbon backbones, for example, of between $C_6$ and $C_{25}$ and be saturated or unsaturated.

In embodiments, the polymer composition is prepared via extrusion. In a specific embodiment, the polymer composition is prepared via twin screw extrusion. In the particular context of an optic fiber cable, the polymer composition can be extruded as a jacket for an optical fiber cable and/or another component of the optical fiber cable.

In an embodiment, the elastic modulus (alternatively, storage modulus) at −40° C. as measured by dynamic mechanical analysis (DMA) in accordance with ASTM D4065 is at most 1500 MPa. In a further embodiment, the elastic modulus at −40° C. as measured by DMA is at most 1000 MPa, and in still another embodiment, the elastic modulus at −40° C. as measured by DMA is at most 500 MPa. In embodiments, the elastic modulus at −40° C. as measured by DMA is in the range of 200 MPa to 1500 MPa. Further, in embodiments, the CTE, as measured from −40° C. to 25° C., is at least $120 \times 10^{-6}$/K. In other embodiments, the CTE is at least $140 \times 10^{-6}$/K, and in still other embodiments, the CTE is at least $160 \times 10^{-6}$/K. In embodiments, the CTE is at most $300 \times 10^{-6}$/K. Still further, in embodiments, the thermal contraction stress at −40° C. as measured using a dynamic mechanical analyzer is at most 4.0 MPa. In other embodiments, the thermal contraction stress at −40° C. is at most 3.0 MPa, and in still other embodiments, the thermal contraction stress at −40° C. is at most 2.0 MPa.

EXAMPLES

Several exemplary polymer compositions were prepared according to the compositions provided in Table 1, below. C1 and C2 are comparative examples, and E1-E5 are examples according to the present disclosure. In Table 1, LLDPE corresponds to Borstar® LE8707 (available from Borealis AG, Vienna, Austria), OBC1 corresponds to the olefin block copolymer INFUSE™ 9100, LDPE corresponds to AGILITY™ 1021, OBC2 corresponds to INFUSE™ 9500, and OBC3 corresponds to INFUSE™ 9807 (the INFUSE™ and AGILITY™ polymers are available from The Dow Chemical Company, Midland, Mich., USA). OBC1 and OBC2 have the same density of 0.877 g/cm³, but OBC2 had a higher melt index (5 g/10 min vs 1 g/10 min (2.16 kg @ 190° C.)). OBC3 had a lower density than OBC1 and OBC2 at 0.866 g/cm³, but OBC3 had the highest melt index (15 g/10 min).

TABLE 1

Formulations and Properties Polymer Compositions

| | Composition | Weight Ratio | Thermal Contraction Stress (MPa) |
|---|---|---|---|
| C1 | LLDPE | 100/0 | 4.85 |
| C2 | LLDPE/SEBS/Clay | 50/40/10 | 1.78 |
| E1 | LLDPE/OBC1 | 70/30 | 2.95 |
| E2 | LLDPE/OBC1 | 50/50 | 1.44 |
| E3 | LLDPE/OBC1/CaCO₃ Masterbatch | 40/40/20 | 1.56 |
| E4 | LDPE/OBC2 | 30/70 | 0.97 |
| E5 | LDPE/OBC3 | 50/50 | 1.79 |

As shown in Table 1, the thermal contraction stress for each composition C1 and C2 and E1-E5 was measured. In particular, the thermal contraction stress was measured using a dynamic mechanical analyzer (DMA) on an extruded sample held between two clamps by reducing the temperature from 35° C. to −40° C. and measuring the contraction stress at −40° C. As can be seen in Table 1, C1, which contained only LLDPE, exhibited a contraction stress of 4.85 MPa, which is significantly higher than C2 and E1-E5. C2 was a low-CTE formulation that had a contraction stress below 2 MPa, but as discussed below, the elastic modulus for C2 was much higher than 1500 MPa at −40° C. The CTE of C2 was also lower over the temperature range of −40° C. to 40° C. than for E1-E5. In a comparison of E1 and E2, it can be seen that the contraction stress decreases as the amount of thermoplastic elastomer (OBC1) increases; however, both E1 and E2 are below a contraction stress of 4.0 MPa. Further, as shown in E3, the polyolefin and thermoplastic elastomer remain in a 1:1 ratio, but 20% by weight of a filler is added to the masterbatch. As can be seen, the contraction stress only slightly increases from E2. E4 and E5 demonstrate the contraction stress for compositions containing another polyolefin, LDPE. As with E1 and E2, the contraction stress decreases as the amount of thermoplastic elastomer increases.

The elastic moduli of the C1, C2, E2, and E3 were obtained using DMA and are shown in FIG. 1 for the temperature range of −40° C. to 80° C. As can be seen in FIG. 1, the elastic moduli of E2 and E3 are much flatter over the temperature range than C1 and C2. In particular, the elastic modulus of C1 increases rapidly as the temperature decreases. C2 has a somewhat flat elastic modulus until about −20° C. below which point the elastic modulus increases sharply. Indeed, C2 has an elastic modulus at −40° C. of approximately 2000 MPa. In contrast, E2 (without filler) and E3 (with filler) have elastic moduli that are below 1000 MPa over the entire temperature range depicted.

Figure 2:
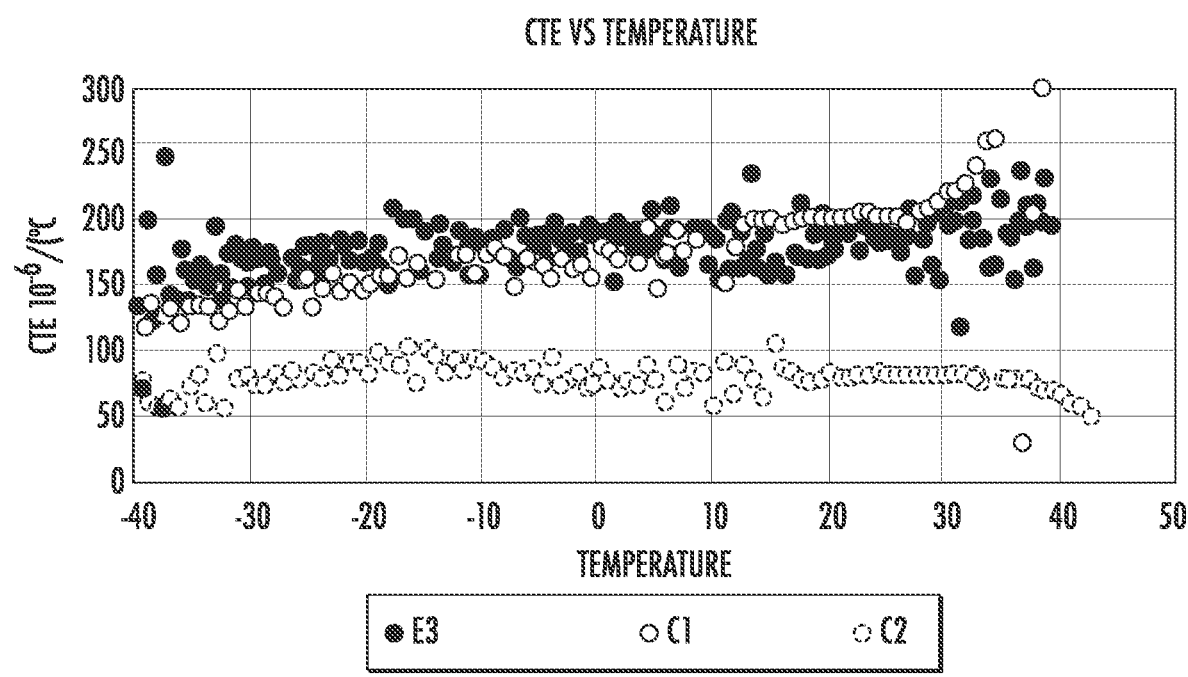
FIG. 2 is a graphical representation of the coefficient of thermal expansion over a range of temperatures for a polymer composition made according to an exemplary embodiment as well as for comparative examples.
Figure 3:
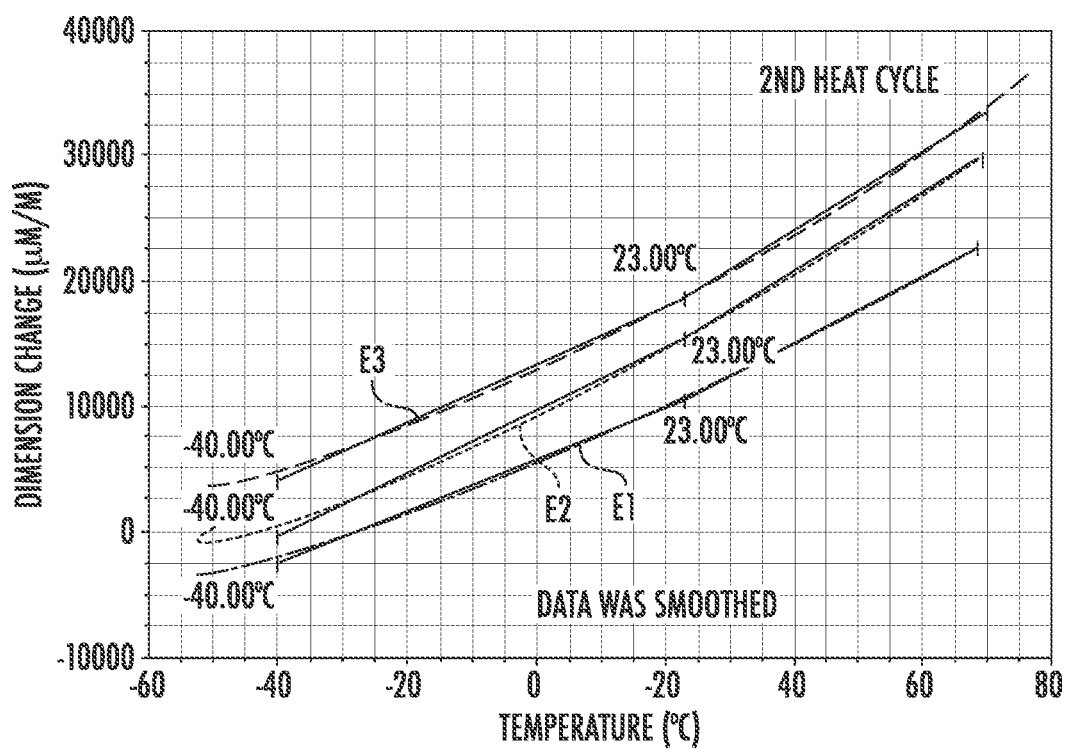
FIG. 3 depicts dimensional changes as a function of temperature for the calculation of the coefficient of thermal expansion for polymer compositions made according to exemplary embodiments.

FIG. 2 depicts the CTE for E3, C1, and C2 as measured in the temperature range of −40° C. to 40° C. As can be seen clearly, C2 has a much lower CTE than E3 and C1 over the temperature range, which is how the low thermal contraction stress shown in Table 1 is achieved. However, E3 is able to achieve a lower thermal contraction stress than C2 despite having a CTE that is about the same as C1. Thus, FIGS. 1 and 2 demonstrate the inverted nature of CTE and elastic modulus to achieve a low (e.g., less than 4.0 MPa) thermal contraction stress as evidenced by samples E3 and C2. FIG. 3 depicts the CTE measurements taken between −40° C. and 70° C. for E1-E3. As calculated based on the measurements shown on the graph of FIG. 3, the averaged CTE from −40° C. to 23° C. for these three samples is in the range of about $200 \times 10^{-6}$/K to $250 \times 10^{-6}$/K. The thermal expansion behavior of the polymer compositions was measured by thermomechanical analysis (TMA) in accordance with ASTM E831.

Figure 4:
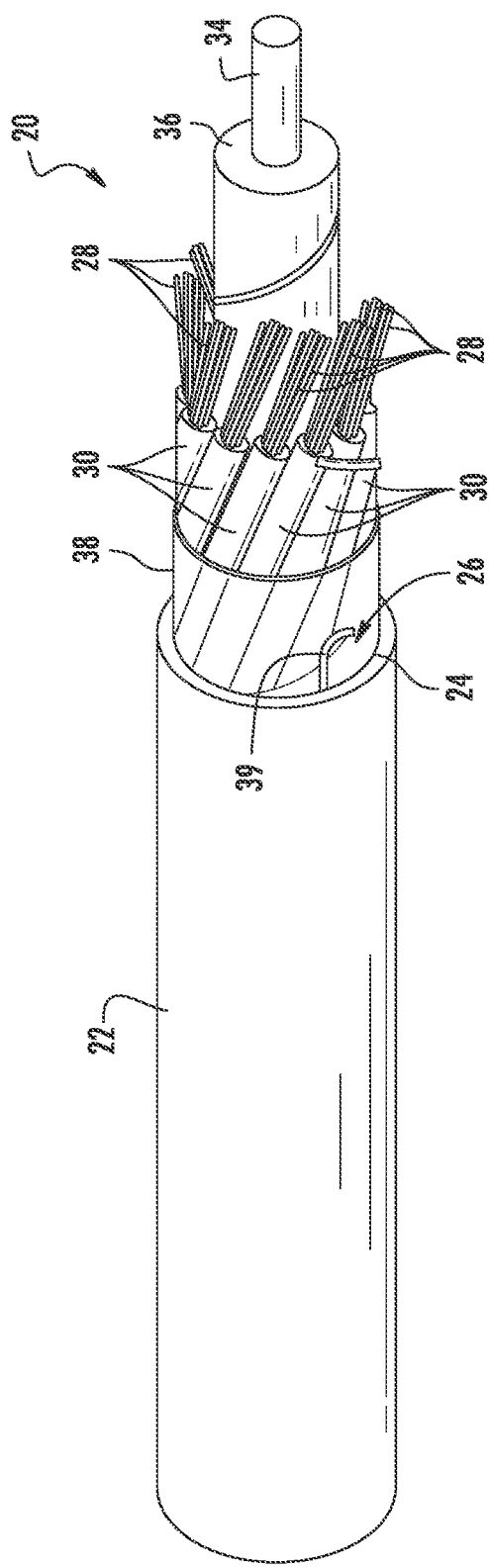
FIG. 4 is an illustration of an optic fiber cable in which components of the cable include polymer compositions made according to exemplary embodiments.

The polymer composition disclosed herein can be applied in a variety of contexts. In a particular embodiment shown in FIG. 4, the polymer composition is used as a jacket for a cable or cable component. The cable shown in FIG. 4 is a fiber optic cable 20. Cable 20 includes a cable body, shown as cable jacket 22, having an inner surface 24 that defines a channel, shown as central bore 26. Pluralities of communication elements, shown as optical fibers 28, are located within bore 26. The cable 20 includes a plurality of core elements located within central bore 26. A first type of core element is an optical transmission core element, and these core elements include bundles of optical fibers 28 that are located within tubes, shown as buffer tubes 30. Buffer tubes 30 are arranged around a central support, shown as central strength member 34. Central strength member 34 includes an outer coating layer 36. A barrier material, such as water barrier 38, is located around the wrapped buffer tubes 30. An easy access feature, shown as rip cord 39, may be located inside cable jacket 22 to facilitate access to buffer tubes 30.

In one embodiment, the polymer composition is incorporated into the cable jacket 22 of fiber optic cable 20. In another embodiment, the polymer composition is used to upcoat the central strength member 34 to form the outer coating layer 36. For example, the selection of the number of buffer tubes 30 can define an interior open geometry that is filled/supported by the central strength member 34 and outer coating layer 36. In order to reduce the cost of the optic fiber cable 20, the central strength member 34 can be made as thin as possible while still providing the necessary support for the cable 20. The remainder of the interior open geometry can be filled with the outer coating layer 36 by upcoating the polymer composition on the central strength member 34. In this way, the cost of providing the central strength member 34 and outer coating layer 36 is reduced as the presently disclosed polymer composition used to form the outer coating layer 36 is generally less expensive in terms of material cost than the central strength member 34.

Figure 5:
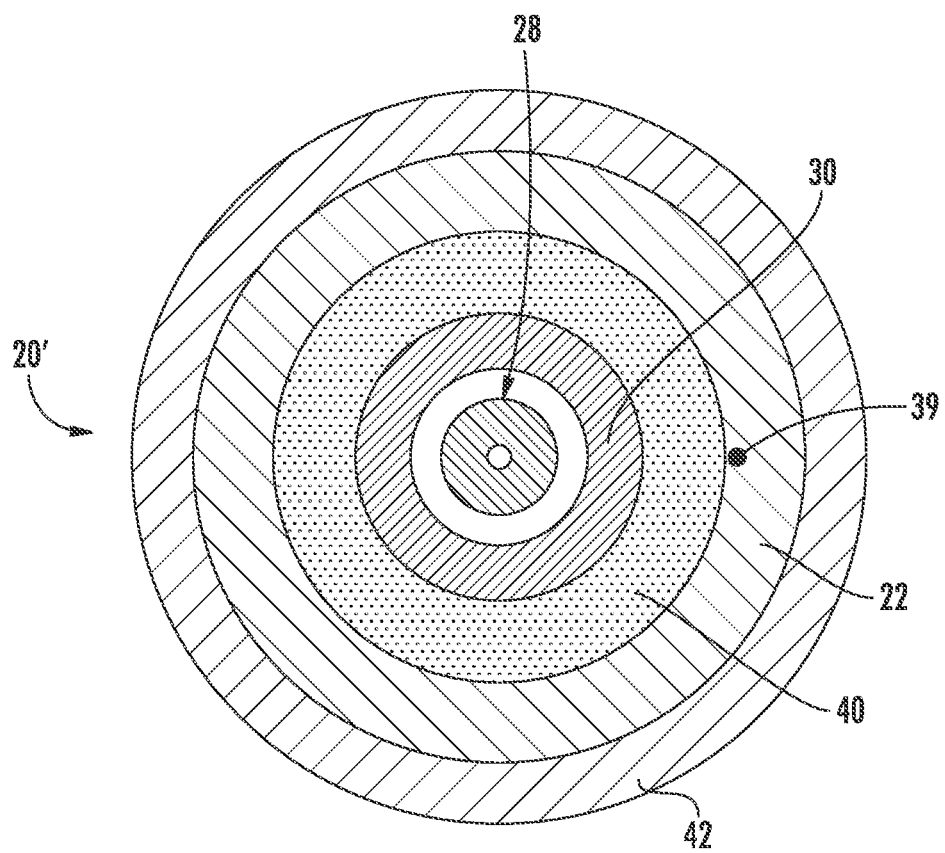
FIG. 5 is an illustration of a round drop cable having a cable jacket that includes the polymer composition, according to an exemplary embodiment.

FIG. 5 depicts a cross-section of another embodiment of an optical fiber cable 20', which is a round drop cable (i.e., aerial, buried, or ducted cable leading to premises). The optical fiber cable 20' includes an optical fiber 28 contained within a buffer tube 30. In the embodiment depicted, only a single optical fiber 28 is contained in the buffer tube 30, but in other embodiments, more than one optical fiber 28 could be contained in the buffer tube 30. The buffer tube 30 is surrounded by a plurality of tensile yarns 40, such as an aramid, a carbon fiber, an ultra-high molecular weight polyethylene (UHMWPE), an ethylene chlorotrifluoroethylene (ECTFE), a polybenzimidazole (PBI), a perfluoroalkoxy (PFA), a polytetrafluoroethylene (PTFE), a polyphenylene sulfide (PPS), a liquid crystal polymer (LCP), or a polyphenylene benzobisoxazole (PBO). Advantageously, these relatively softer tensile yarns 40 can replace conventionally used stiffer, glass yarns so as to enhance bend performance. Disposed around the tensile yarns 40 is the cable jacket 22. The cable jacket 22 is made from the polymer composition disclosed herein. As shown in FIG. 5, an access feature 39 is embedded in the cable jacket 22. FIG. 5 also depicts an optional outercoat 42 extruded around the cable jacket 22. In such embodiments, the optional outercoat 42 of the optical fiber cable 20' is a layer of LLDPE, MDPE, HDPE, etc., which can be used to lower the coefficient of friction of the resulting cable when the cable is blown inside a duct. In such embodiments, the outercoat 42 can be thinner than the cable jacket 22.

Also, using the polymer composition disclosed herein provides several advantages. In particular, the polymer composition can be used to produce optic fiber cables with enhanced thermal performance and reduced manufacturing cost. Ultimately, incorporating the disclosed polymer composition in various components of the optic fiber cables can help to realize the goals of reducing buffer tube size, shortening lay lengths, and driving cable design to concurrent performance limits under load and at low temperature.

Further, polymer compositions made according to the embodiments disclosed herein offer several additional advantages when used as components for optic fiber cable. For example, the polymer composition can help expand the optical fiber cable operating temperature range to −40° C. or below. Also, the lower thermal contraction stress of less than 4.0 MPa can reduce the attenuation of optic fibers in contact with the polymer composition that results from the contraction of the polymer composition in cold environments. Additionally, the polymer composition can allow for smaller buffer tubes to be used, resulting in lower material cost and lower overall product cost. As discussed above, the polymer composition can help to reduce the diameter (and consequently the cost) of the central strength member. Further, because of the potential to produce smaller cable sizes by using the disclosed polymer composition, the resultant cable is expected to have better blowing performance during installation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A polymer composition comprising:
   from 0% to 80% by weight of a polyolefin component; and
   from 20% to 100% by weight of a thermoplastic elastomer component;
   wherein the polymer composition has an elastic modulus of at most 1500 MPa at −40° C. as measured using dynamic mechanical analysis according to ASTM D4065;
   wherein the polymer composition has a coefficient of thermal expansion as averaged over the temperature range of −40° C. to 25° C. of at least $120 \times 10^{-6}$/K when measured according to ASTM E831; and
   wherein the polymer composition has a thermal contraction stress of at most 4.0 MPa at −40° C. as measured using dynamic mechanical analysis.

2. The polymer composition of claim 1, wherein the polyolefin component comprises at least one of medium-density polyethylene, high-density polyethylene, low-density polyethylene, linear low-density polyethylene, or polypropylene.

3. The polymer composition of claim 1, wherein the thermoplastic elastomer component comprises at least one of olefin block copolymers, olefin random copolymers, ethylene-propylene rubber, ethylene-propylene-diene rubber, ethylene-octene, ethylene-hexene, ethylene-butene, ethylene-vinyl acetate, or styrene-ethylene-butadiene-styrene.

4. The polymer composition of claim 1, wherein the coefficient of thermal expansion is at least $160 \times 10^{-6}$/K.

5. The polymer composition of claim 1, wherein the coefficient of thermal expansion is at most $300 \times 10^{-6}$/K.

6. The polymer composition of claim 1, wherein the thermal contraction stress is at most 2.0 MPa.

7. The polymer composition of claim 1, comprising up to 40% by weight of a filler component.

8. The polymer composition of claim 7, wherein the filler component comprises at least 2.5% by weight of carbon black for UV protection.

9. The polymer composition of claim 7, wherein the filler component comprises a flame retardant additive.

10. The polymer composition of claim 9, wherein the flame retardant additive comprises at least one of alumina trihydrate, magnesium hydroxide, boehmite, $CaCO_3$, or an intumescent material.

11. An optical fiber cable comprising:
at least one optical fiber;
a polymeric jacket that surrounds the at least one optical fiber;
wherein the polymeric jacket is formed at least in part from a polymer composition comprising:
from 0% to 80% by weight of a polyolefin component;
from 20% to 100% by weight of a thermoplastic elastomer component;
wherein the polymer composition has an elastic modulus of at most 1500 MPa at −40° C. as measured using dynamic mechanical analysis according to ASTM D4065;
wherein the polymer composition has a coefficient of thermal expansion as averaged over the temperature range of −40° C. to 25° C. of at least $120 \times 10^{-6}$/K when measured according to ASTM E831; and
wherein the polymer composition has a thermal contraction stress of at most 4.0 MPa at −40° C. as measured using dynamic mechanical analysis.

12. The optical fiber cable of claim 11, wherein the polyolefin component comprises at least one of medium-density polyethylene, high-density polyethylene, low-density polyethylene, linear low-density polyethylene, or polypropylene.

13. The optical fiber cable of claim 11, wherein the thermoplastic elastomer component comprises at least one of olefin block copolymers, olefin random copolymers, ethylene-propylene rubber, ethylene-propylene-diene rubber, ethylene-octene, ethylene-hexene, ethylene-butene, ethylene-vinyl acetate, or styrene-ethylene-butadiene-styrene.

14. The optical fiber cable of claim 11, wherein the coefficient of thermal expansion is at least $160 \times 10^{-6}$/K.

15. The optical fiber cable of claim 14, wherein the coefficient of thermal expansion is at most $300 \times 10^{-6}$/K.

16. The optical fiber cable of claim 14, wherein the polymer composition has a thermal contraction stress of at most 2.0 MPa.

17. The optical fiber cable of claim 11, wherein the polymer composition comprises up to 40% by weight of a filler component.

18. The optical fiber cable of claim 17, wherein the filler component comprises a flame retardant additive.

19. The optical fiber cable of claim 18, wherein the flame retardant additive comprises at least one of alumina trihydrate, magnesium hydroxide, boehmite, $CaCO_3$, or an intumescent material.

20. The optical fiber cable of claim 17, wherein the filler component comprises at least 2.5% by weight of carbon black for UV protection.

21. The optical fiber cable of claim 11, wherein the polymeric jacket is coextruded with an outer layer of at least one of linear low-density polyethylene, medium-density polyethylene, or high-density polyethylene, and wherein the outer layer is thinner than the polymeric jacket.

22. The optical fiber cable of claim 11, further comprising a buffer tube and a plurality of aramid yarns, wherein the at least one optical fiber is arranged in the buffer tube and wherein the plurality of aramid yarns are disposed around the buffer tube.

23. The optical fiber cable of claim 22, wherein the optical fiber cable does not comprise any glass yarns used as a tensile element.

24. An optical fiber drop cable comprising:
at least one optical fiber;
a buffer tube disposed around the at least one optical fiber;
a plurality of tensile yarns disposed around the buffer tube;
a polymeric jacket disposed around the plurality of tensile yarns;
wherein the polymeric jacket is formed at least in part from the polymer composition according to claim 1.

* * * * *